United States Patent
Recio, III et al.

(10) Patent No.: US 10,961,434 B2
(45) Date of Patent: Mar. 30, 2021

(54) VAPOR PHASE DEPOSITION OF POLYHYDROXYETHERAMINES ON WATER-SENSITIVE MINERALOGIES

(71) Applicant: Halliburton Energy Services, Inc., Houston, TX (US)

(72) Inventors: Antonio Recio, III, Humble, TX (US); Denise Nicole Benoit, Houston, TX (US); Enrique Antonio Reyes, Tomball, TX (US); Kurt Hoeman, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/337,366

(22) PCT Filed: Dec. 1, 2016

(86) PCT No.: PCT/US2016/064396
§ 371 (c)(1),
(2) Date: Mar. 27, 2019

(87) PCT Pub. No.: WO2018/101946
PCT Pub. Date: Jun. 7, 2018

(65) Prior Publication Data
US 2019/0233718 A1    Aug. 1, 2019

(51) Int. Cl.
*C09K 8/588*    (2006.01)
*C09K 8/592*    (2006.01)
(Continued)

(52) U.S. Cl.
CPC ............. *C09K 8/588* (2013.01); *C09K 8/592* (2013.01); *C09K 8/594* (2013.01); *E21B 43/168* (2013.01);
(Continued)

(58) Field of Classification Search
CPC ........ C09K 8/5086; C09K 8/588; C09K 8/68; C09K 8/72; C09K 8/885; C09K 8/5083;
(Continued)

(56) References Cited

U.S. PATENT DOCUMENTS

| | | |
|---|---|---|
| 4,291,766 A | 9/1981 | Davies et al. |
| 5,199,490 A | 4/1993 | Surles et al. |

(Continued)

FOREIGN PATENT DOCUMENTS

WO    2015-060891 A1    4/2015

OTHER PUBLICATIONS

International Search Report & Written Opinion issued for corresponding International Application No. PCT/US2016/064396 dated Aug. 29, 2017. (13 pages).

(Continued)

*Primary Examiner* — Zakiya W Bates
(74) *Attorney, Agent, or Firm* — McGuireWoods LLP

(57) ABSTRACT

Methods and systems for treating a subterra-nean formation. An example method comprises pumping an aerosol comprising a vaporized carrier fluid and a dispersed polyhydroxyetheramine in a wellbore penetrating the sub-terranean formation; depositing the polyhydroxyetheramine on a surface of the subterranean formation; and producing hydrocarbons from the treated subterranean formation.

20 Claims, 6 Drawing Sheets

(51) Int. Cl.
  *C09K 8/594* (2006.01)
  *E21B 43/16* (2006.01)
  *E21B 43/22* (2006.01)
  *E21B 43/24* (2006.01)

(52) U.S. Cl.
  CPC ............. *E21B 43/164* (2013.01); *E21B 43/24* (2013.01); *Y02P 20/54* (2015.11)

(58) Field of Classification Search
  CPC ........ C09K 8/035; C09K 8/508; C09K 8/514; E21B 43/283; E21B 21/003; E21B 33/13; E21B 43/16; E21B 43/162; E21B 43/164; E21B 43/168; E21B 43/24; E21B 43/25
  See application file for complete search history.

(56) References Cited

U.S. PATENT DOCUMENTS

| | | | |
|---|---|---|---|
| 5,199,492 A | 4/1993 | Surles et al. | |
| 9,169,430 B2 | 10/2015 | Dalrymple et al. | |
| 2009/0260828 A1 | 10/2009 | Kubala et al. | |
| 2014/0116691 A1 | 5/2014 | Dalrymple et al. | |
| 2016/0257879 A1* | 9/2016 | Huang ................... | C09K 8/594 |

OTHER PUBLICATIONS

Ladutko et al., "Field Application Results of Water Permeability Modifier in Fracture Stimulation Treatments in Western Siberia" Society of Petroleum Engineers, SPE-158389-MS; Jan. 1, 2012, 11 pages.

* cited by examiner

VAPOR PHASE DEPOSITION OF POLYHYDROXYETHERAMINES ON WATER-SENSITIVE MINERALOGIES

TECHNICAL FIELD

The present disclosure relates to the deposition of polyhydroxyetheramines on water-sensitive formations and more particularly, to various systems and methods used to transport an aerosol comprising a polyhydroxyetheramine and a vaporized carrier fluid to a water-sensitive formation where the polyhydroxyetheramine may be deposited.

BACKGROUND

The recovery of hydrocarbons from water-sensitive formations may be difficult if the formations are left untreated and exposed to aqueous fluids which may negatively impact the permeability of a water-sensitive formation. Water-sensitive formations comprise water-sensitive materials such as swellable clays, shale, and the like. Water-sensitive materials undergo chemical and/or physical changes when contacted with aqueous fluids and may swell, slough off, deflocculate, deform, or otherwise degrade. Water-sensitive materials that destabilize can damage the permeability of the producing interval of the subterranean formation. For example, contact with aqueous fluids may destabilize the formation by weakening the integrity of the rock substrate as described. This destabilization may result in the partial or complete blockage of the fluid flowpaths (e.g., fractures, pores, etc.) in the subterranean formation, thereby resulting in a loss in permeability of the formation. This loss in permeability may impair the hydrocarbon fluids into the wellbore, and can lead to a decrease in production. Moreover, some of the chemical and/or physical changes in the water-sensitive materials can induce deflocculation and yield fines capable of migrating and being produced. These fines may induce abrasion and other problems with the production equipment in addition to the potential reduction in flowpath permeability.

Formation-stabilizing materials may be used to stabilize the water-sensitive areas of a subterranean formation. Some formation-stabilizing materials, for example, quaternary amines (i.e. salts of quaternary ammonium cations) are introduced into and deposited in the wellbore using aqueous carrier fluids. These aqueous carrier fluids are used in the liquid phase to carry the formation-stabilizing materials to the desired portion of the subterranean formation. Problems exist with the use of liquid phase aqueous carrier fluids. For example, the liquid aqueous carrier fluids may cause formation damage that can result in reduced permeability of the producing interval of the subterranean formation. Additionally, the formation-stabilizing materials may only be applied to the areas in which the liquid carrier fluid is able to flow. If the formation-stabilizing materials are applied to a reduced or minimal portion of the producing interval of the subterranean formation, formation damage may still result and the permeability of the subterranean formation may be reduced. This issue may be especially pronounced in low permeability formations where the viscosity of the liquid aqueous carrier fluid may impact its ability to penetrate into the low permeability formation resulting in the formation-stabilizing materials treating a reduced area of the low permeability formation.

BRIEF DESCRIPTION OF THE DRAWINGS

Illustrative examples of the present disclosure are described in detail below with reference to the attached drawing figures, which are incorporated by reference herein, and wherein.

Figure 1:
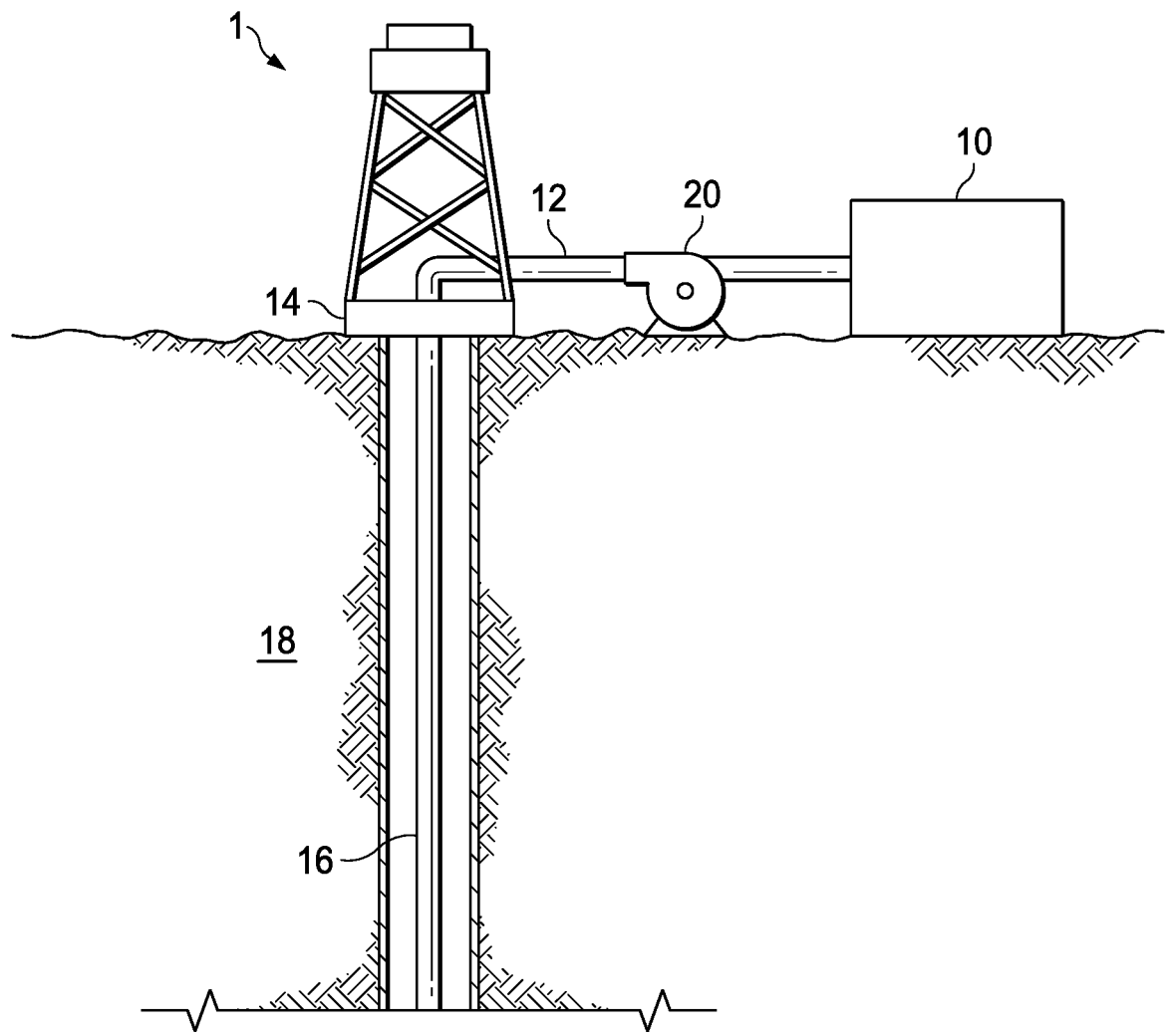
FIG. 1 is a schematic illustrating a system to deliver the aerosol to a downhole location according to one or more examples.

The illustrated figures are only exemplary and are not intended to assert or imply any limitation with regard to the environment, architecture, design, or process in which different examples may be implemented.

DETAILED DESCRIPTION

The present disclosure relates to the deposition of polyhydroxyetheramines on water-sensitive formations and more particularly, to various systems and methods used to transport an aerosol comprising a polyhydroxyetheramine and a vaporized carrier fluid to a water-sensitive formation where the polyhydroxyetheramine may be deposited.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods and systems described herein comprise dispersing a polyhydroxyetheramine in a vaporized carrier fluid to produce an aerosol. The polyhydroxyetheramine is the dispersed phase of the aerosol. The carrier fluid is the continuous phase of the aerosol. The aerosol may be introduced into a wellbore penetrating a subterranean formation. The subterranean formation may be a water-sensitive subterranean formation comprising an interval or zone with water-sensitive materials. The aerosol may contact the water-sensitive materials. The dispersed polyhydroxyetheramine may coat at least a portion of the water-sensitive materials. The coating may stabilize the water-sensitive materials and prevent a loss of integrity in the water-sensitive materials from aqueous fluid interactions. For example, the coating may prevent the water-sensitive materials from generating fines via deflocculation. As another example, the coating may prevent the water-sensitive materials from swelling. As such, the coating may prevent the negative substrate/fluid interactions that can lead to reduced permeability in water-sensitive formations. The aerosol may be produced in the wellbore or may be produced on the surface and introduced into the wellbore. The aerosol may be used to treat production wells and/or injection wells adjacent to production wells. In some examples, the aerosol may comprise a non-aqueous carrier fluid. In some examples, the coating may improve mineral adhesion. In some examples, the coating may reduce mineral dissolution.

The aerosol comprises a polyhydroxyetheramine. The polyhydroxyetheramine is a branched water-soluble polyhydroxyetheramine. The polyhydroxyetheramine may comprise polyalkylene oxide sidechains. In some examples, the polyhydroxyetheramine may be cross-linked. In some examples, the polyhydroxyetheramine may be provided in the form of a salt. In some alternative examples, the polyhydroxyetheramine may be provided in the form of a solution. The polyhydroxyetheramine may have a molecular weight in the range of about 1000 to about 500,000, alternatively, in a range of about 2000 to about 250,000, or further alternatively, in a range of about 5000 to about 100,000. The polyhydroxyetheramine is a disproportionate permeability modifier and may provide greater resistance to the flow of water than that of other non-aqueous fluids. The polyhydroxyetheramine is a polyether and may comprise no or very few polyamine linkages, unlike quaternary amines. As such, the polyhydroxyetheramine does not rely on a large amount of cationic charges to provide a coating to a negatively charged substrate.

Without limitation, the synthesis reactions provided below are presented merely to illustrate various processes of producing a suitable polyhydroxyetheramine and are not to be construed as to limit the scope of the polyhydroxyetheramine, the disclosure, and the methods and systems described herein.

As an example, the polyhydroxyetheramine may be synthesized by reacting a primary amine, a bis(secondary) diamine, a mono-amine-functionalized poly(alkylene oxide), or a mixture thereof with a diglycidyl ether, a diepoxy-functionalized poly(alkylene oxides), or a mixture thereof. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by reacting an equivalent or excess of a difunctional amine or a mixture thereof with an excess or equivalent amount of a diglycidyl ether of a bisphenol or a mixture thereof. Optionally, this reaction may be done in the presence of a monofunctional nucleophile that functions as a terminating agent. Optionally, this reaction may be done in the presence of a catalyst and/or a solvent. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by dissolving in an organic or non-organic solvent: an amine selected from the group consisting of primary amine, a bis(secondary) diamine, or a mono-amine-functionalized poly(alkylene oxide) or a mixture thereof; adding to the amine solution an epoxide selected from the group consisting of a diglycidyl ether, a diepoxy-functionalized poly(alkylene oxides) or mixture thereof in an amine hydrogen equivalent to epoxide equivalent ratio of from 1.01:1 to 1.1:1. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by reacting a diepoxide or a mixture of diepoxides and multi-epoxide compounds with one or more alkylene oxide functionalized amines or a mixture of one or more alkylene oxide functionalized amines and one or more amines. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by reacting a mixture of diepoxide and one or more aliphatic or aromatic triepoxides with one or more alkylene oxide functionalized amines or a mixture of one or more alkylene oxide functionalized amines and one or more fatty amines. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by reacting an amine having two reactive hydrogen atoms with a diepoxide to form a polyhydroxyetheramine; then reacting the polyhydroxyetheramine with an N-alkylating agent to form a water-soluble branched polyhydroxyetheramine. Optionally, one or more aliphatic triepoxides may be added simultaneously with the diepoxide. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by the reaction of bisphenol A (a diepoxy compound), an ethanolamine, a diethanol amine, and a JEFFAMINE™ (i.e. a family of commercially available polyetheramines). JEFFAMINE is a registered trademark of Huntsman International LLC.

In some examples, the polyhydroxyetheramine may be synthesized to comprise secondary amine, tertiary amine, or ditertiary amine end groups if desired.

Some specific examples of the polyhydroxyetheramine include, but are not limited to, a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino) propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly (ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; the like; derivatives thereof; or mixtures thereof.

In examples, a vaporized carrier fluid is used to transport the polyhydroxyetheramine to the desired interval of the subterranean formation. The carrier fluid may be used to carry the polyhydroxyetheramine to the desired interval of a subterranean formation. The carrier fluid may comprise steam, methane, ethane, propane, butane, carbon dioxide, nitrogen, derivatives thereof, or mixtures thereof. In the specific example of steam, water may be provided in the liquid phase and then heated to the vaporization temperature to produce the steam. In the specific examples of propane or butane, the propane or butane may be provided as a condensate from a natural gas stream or as a compressed liquid. In such cases, the propane or butane may be heated or otherwise allowed to increase in temperature in order to vaporize the liquid propane or butane such that it may sufficiently comprise a gaseous state sufficient for transport of the polyhydroxyetheramine. In some examples, the vaporized carrier fluid may comprise a supercritical fluid, for example, supercritical carbon dioxide may be used to transport the polyhydroxyetheramine. In said examples, the pressure and temperature of the carrier fluid may be increased to or above the critical point for the specific carrier fluid. For ease of illustration and purposes of clarity, reference herein to a "vaporized carrier fluid" refers to a carrier fluid in its gaseous state or its supercritical state. Use of the terms "vapor," "vaporized," and all derivatives thereof includes the use of fluids in their supercritical states.

The concentration of the polyhydroxyetheramine in the aerosol may range from about 0.005% (w/w) of the aerosol to about 20.0% (w/w) of the aerosol. The concentration of the polyhydroxyetheramine in the aerosol may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the polyhydroxyetheramine in the aerosol may be about 0.005% (w/w) of the aerosol, about 0.05% (w/w) of the aerosol, about 0.1% (w/w) of the aerosol, about 0.2% (w/w) of the aerosol, about 1.0% (w/w) of the aerosol, about 5.0% (w/w) of the aerosol, about 10.0% (w/w) of the aerosol, or about 20.0% (w/w) of the aerosol. With the benefit of this disclosure, one of ordinary skill in the art will be able to obtain and prepare an aerosol comprising the polyhydroxyetheramine for a given application.

The present disclosure provides methods and systems of treating a subterranean formation with an aerosol comprising the vaporized carrier fluid and the dispersed polyhydroxyetheramine. The method includes pumping the aerosol in a wellbore. The method also includes contacting an interval of a subterranean formation comprising water-sensitive materials. The method further includes condensing the aerosol such that the polyhydroxyetheramine is deposited on the desired portion of the subterranean formation comprising the water-sensitive materials. The deposited polyhydroxyetheramine may coat the water-sensitive materials. The coating may stabilize the water-sensitive materials and prevent a loss of integrity in the water-sensitive materials from aqueous fluid interactions. The temperature of the interval of the wellbore adjacent to the subterranean formation may be controlled to maintain a sufficient temperature for curing the condensed polyhydroxyetheramine coating on the water-sensitive materials of the subterranean formation. For example, the temperature may be maintained above 100° F. or greater.

The method of treating a subterranean formation can include obtaining or providing an aerosol comprising the vaporized carrier fluid and the polyhydroxyetheramine. The obtaining or providing of the aerosol can occur at any suitable time and at any suitable location. The obtaining or providing of the aerosol can occur at the surface. For example, the carrier fluid may be vaporized, or may already exist as a vapor, and may be pumped into a container comprising a heated polyhydroxyetheramine and passed over the polyhydroxyetheramine such that molecules of the heated polyhydroxyetheramine are allowed to cross the gas-liquid interface of the polyhydroxyetheramine and be dispersed in the vaporized carrier fluid forming an aerosol. In some examples, the vaporized carrier fluid may supply the heat to disperse the polyhydroxyetheramine therein. The aerosol may then be pumped into the wellbore as desired. In some alternative examples, the formation may comprise a temperature and pressure sufficient for vaporizing the carrier fluid. In said examples, a liquid phase carrier fluid including a dispersed polyhydroxyetheramine may be introduced into the wellbore. Upon reaching the vaporization temperature, the carrier fluid may vaporize with the polyhydroxyetheramine dispersed therein.

The placing of the aerosol in the subterranean formation can include contacting any desired interval, portion, part, etc. of the subterranean formation. In some examples, the placing of the aerosol in the subterranean formation may include placing the composition in at least one of a fracture, at least a part of an area surrounding a fracture, a flow pathway, an area surrounding a flow pathway, or an area desired to be fractured. The placing of the aerosol in the subterranean formation can be any suitable placing and can include any suitable contacting between the subterranean formation and the aerosol. The placing of the aerosol in the subterranean formation can include at least partially depositing the polyhydroxyetheramine in a wellbore, fracture, flow pathway, or area surrounding the same.

FIG. 1 is a schematic illustrating a system to deliver the aerosol to a downhole location according to one or more examples. It should be noted that while FIG. 1 generally depicts a land-based system, it is to be recognized that like systems may be operated in subsea locations as well. As depicted in FIG. 1, system, generally 1, may include a mixing tank 10 in which a liquid phase carrier fluid may be mixed with a polyhydroxyetheramine to disperse the polyhydroxyetheramine therein. The liquid phase carrier fluid and the polyhydroxyetheramine may be added to the mixing tank 10 in any sequence. Pump 20 may then be used to pump the liquid phase carrier fluid including the dispersed polyhydroxyetheramine to wellhead 14 via line 12 where the liquid phase carrier fluid including the dispersed polyhydroxyetheramine may enter tubular 16. Tubular 16 may be any type of tubular or conduit for a fluid including, but not limited to, casing, liner, tubing, coiled tubing, jointed tubing, stick pipe, a combination thereof, and the like. Tubular 16 may extend from wellhead 14 into subterranean formation 18. Pump 20 may be a high pressure pump, low pressure pump, or a combination thereof. Pump 20 may be configured to raise the pressure of the liquid phase carrier fluid including the dispersed polyhydroxyetheramine to a desired pressure and/or rate before its introduction into tubular 16. It is to be recognized that system 1 is merely exemplary in nature, and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. The liquid phase carrier fluid including the dispersed polyhydroxyetheramine may be exposed to a sufficient temperature in the wellbore or at the surface prior to introduction into the wellbore to vaporize the liquid phase carrier fluid in the wellbore or prior to introduction into the wellbore. The liquid phase carrier fluid is vaporized with the polyhydroxyetheramine dispersed therein forming an aerosol. The aerosol may then be pumped to the desired interval of the subterranean formation 18 where the polyhydroxyetheramine may be deposited thereon. The temperature necessary to vaporize the carrier fluid is dependent upon, at least in part, the selected carrier fluid. The deposited polyhydroxyetheramine may coat the contacted portion of the subterranean formation 18 treating any water-sensitive materials therein. Hydrocarbons may then be produced from the portion of the subterranean formation 18.

Figure 2:
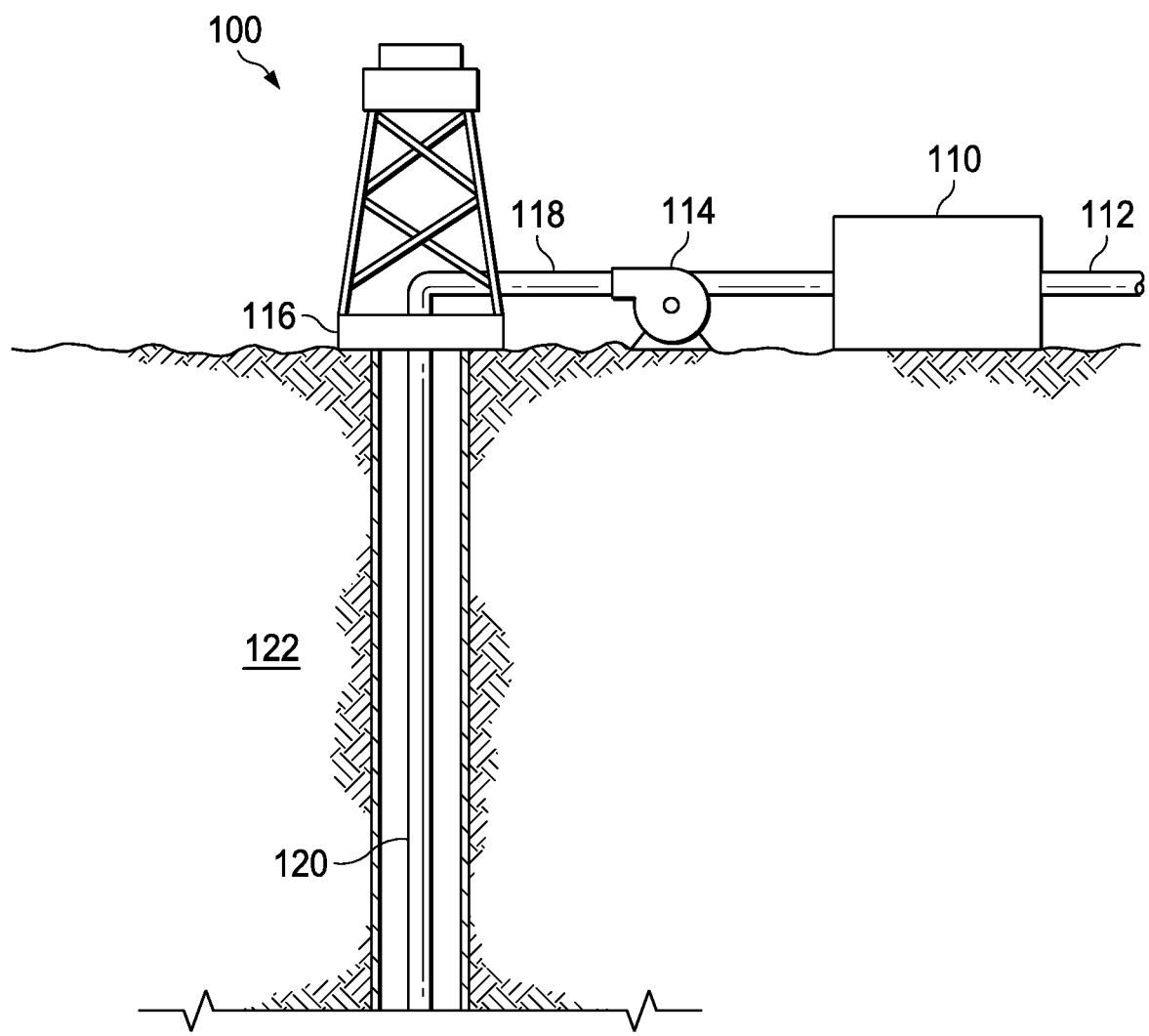
FIG. 2 is a schematic illustrating an alternative system to deliver the aerosol to a downhole location according to one or more examples.

FIG. 2 is a schematic illustrating an alternative system to deliver the aerosol to a downhole location according to one or more examples. It should be noted that while FIG. 2 generally depicts a land-based system, it is to be recognized that like systems may be operated in subsea locations as well. As depicted in FIG. 2, system, generally 100, may include mixing tank 110 in which a liquid polyhydroxyetheramine is contained therein. In some examples, the mixing tank 110 may be heated to energize the polyhydroxyetheramine. A vaporized carrier fluid may be pumped into mixing tank 110 via line 112. The vaporized carrier fluid may be passed over the polyhydroxyetheramine in mixing tank 110 such that the energized molecules of polyhydroxyetheramine may cross the gas-liquid interface and be dispersed in the vaporized carrier fluid forming an aerosol. Pump 114 may then be used to pump the aerosol to wellhead 116 via line 118 where the aerosol may enter tubular 120. Tubular 120 may be any type of tubular or conduit for a fluid including, but not limited to, casing, liner, tubing, coiled tubing, jointed tubing, stick pipe, a combination thereof, and the like. Tubular 120 may extend from wellhead 116 into subterranean formation 122. Pump 114 may be a high pressure pump, low pressure pump, or a combination thereof. Pump 114 may be configured to raise the pressure of the aerosol to a desired pressure and/or rate before its introduction into tubular 120. It is to be recognized that system 100 is merely exemplary in nature, and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. The aerosol may then be pumped to the desired interval of the subterranean formation 122 where the polyhydroxyetheramine may be deposited thereon. The deposited polyhydroxyetheramine may coat the contacted portion of the subterranean formation 122 treating any water-sensitive materials therein. Hydrocarbons may then be produced from the contacted portion of the subterranean formation 122.

Figure 3:
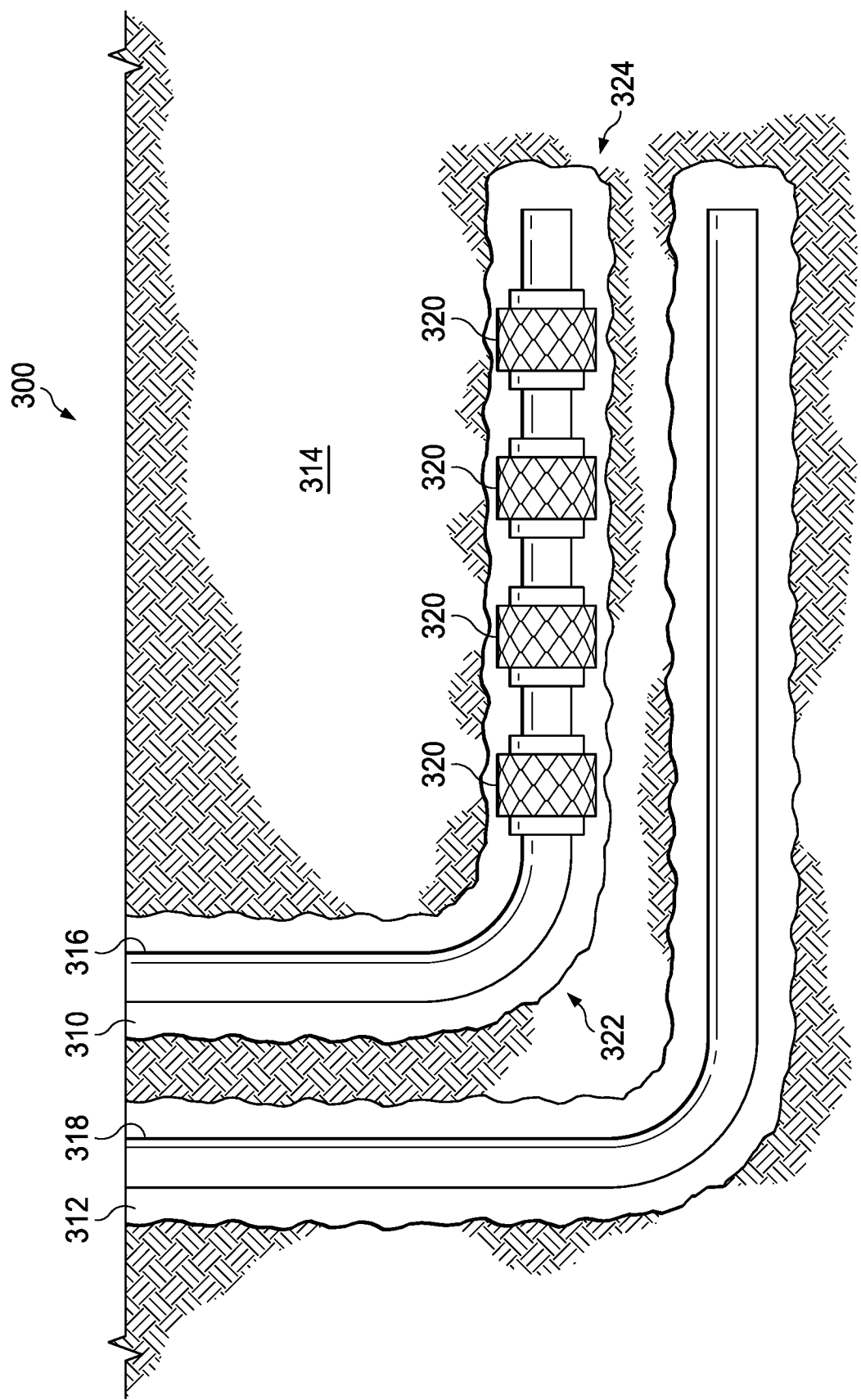
FIG. 3 is a schematic illustrating an alternative system used with steam-assisted gravity drainage operations to deliver the aerosol to a downhole location according to one or more examples.
Figure 4:
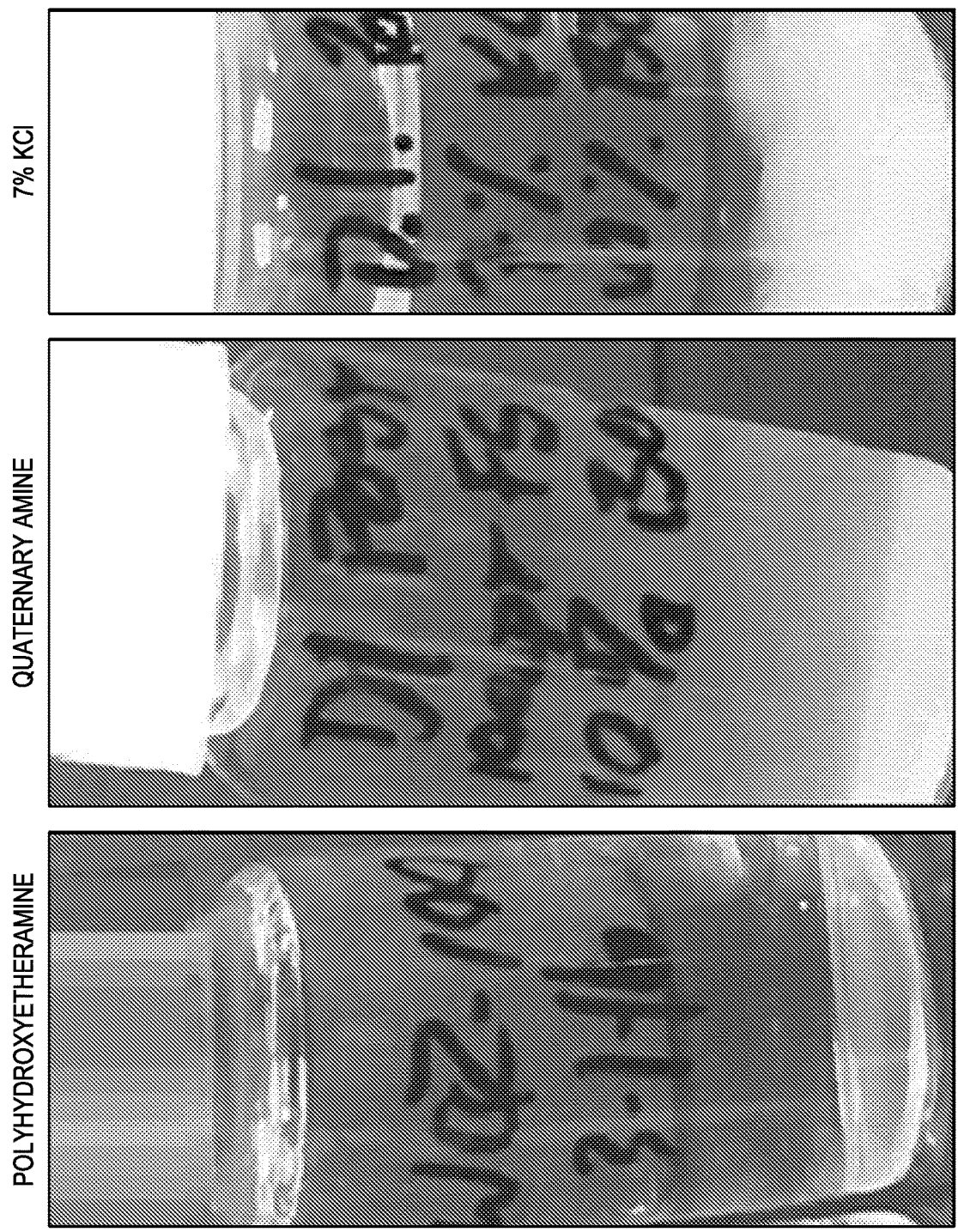
FIG. 4 is a photograph illustrating the visual presence of fines observed in the eluate of sandpacks treated in accordance with one or more examples.
Figure 5:
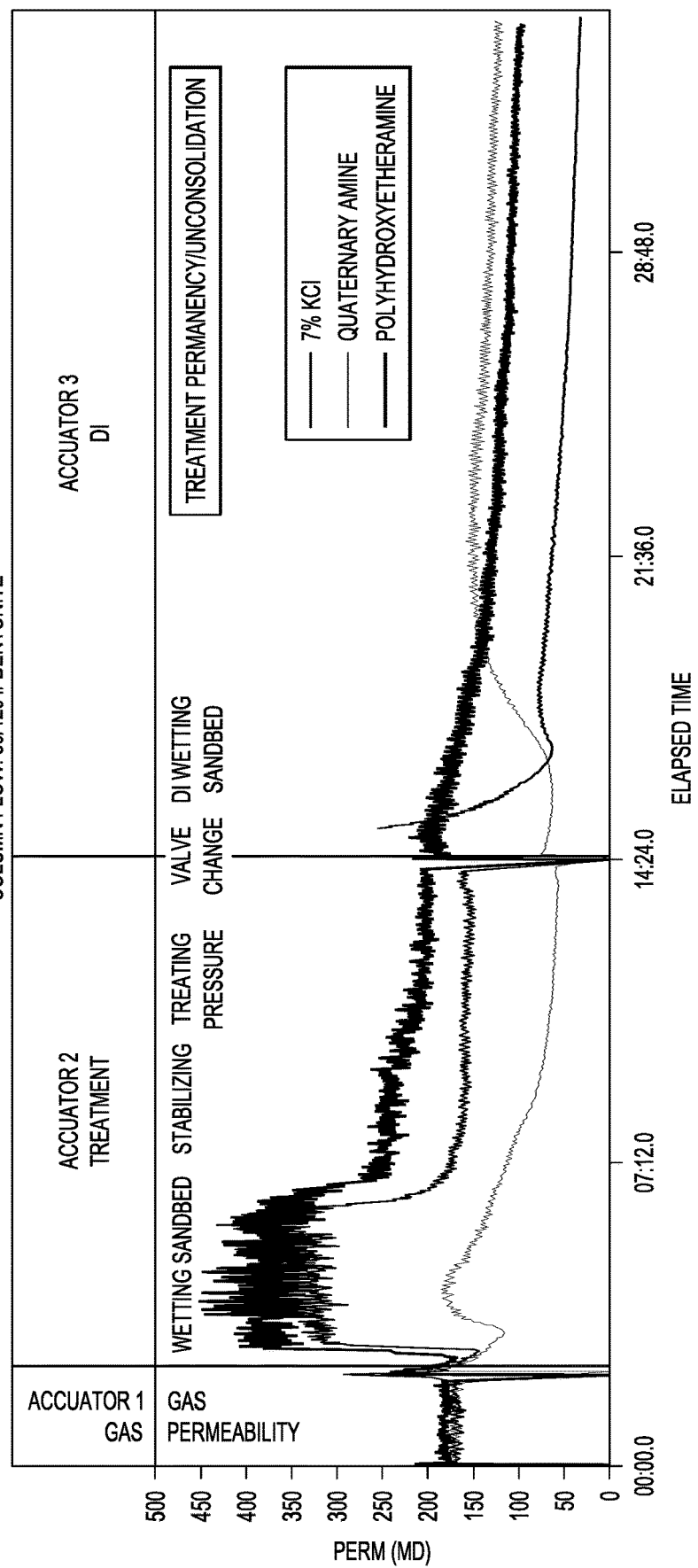
FIG. 5 is graph illustrating the results of permeability tests performed according to one or more examples.
Figure 6A:
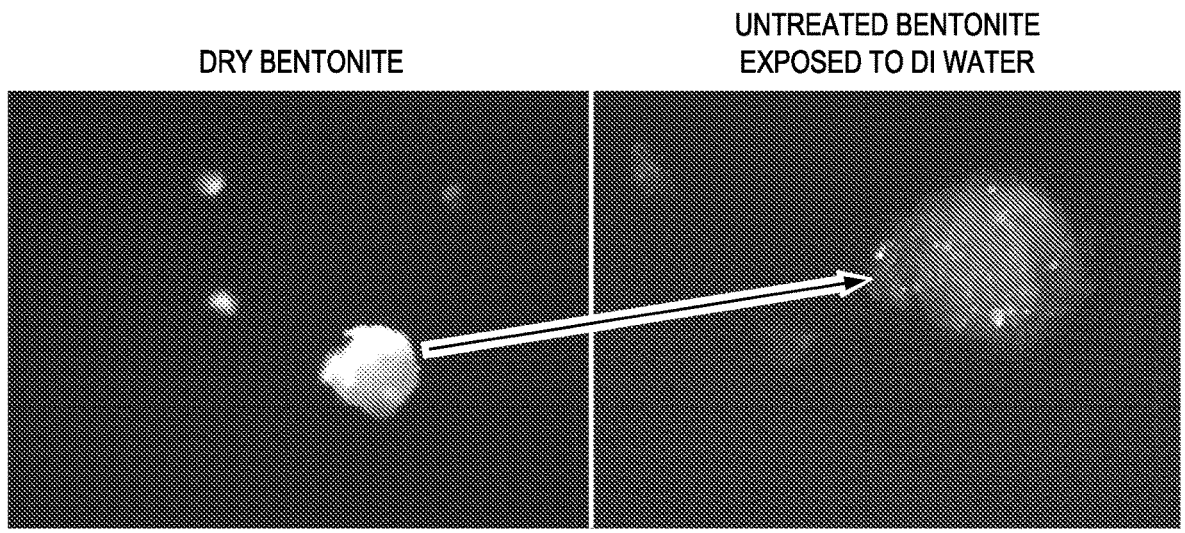
FIG. 6A is a photograph of a microscopic image of untreated bentonite before and after exposure to an aqueous fluid according to one or more examples.
Figure 6B:
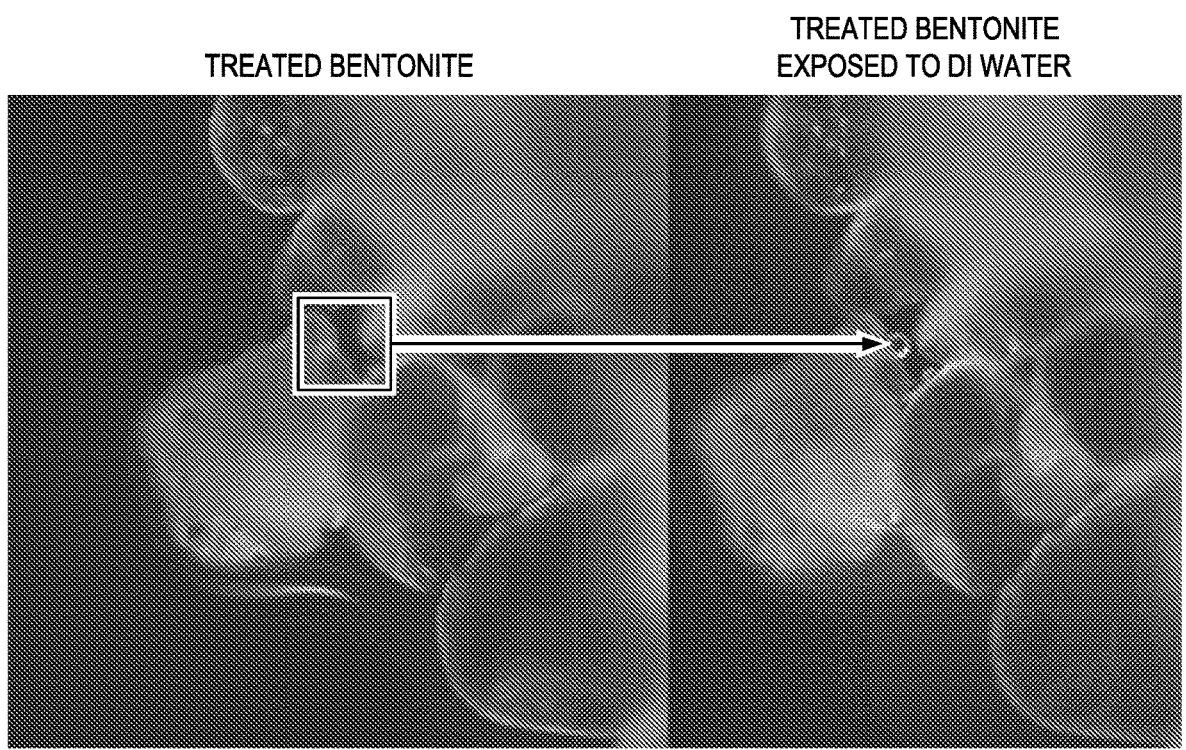
FIG. 6B is a photograph of a microscopic image of bentonite treated with a polyhydroxyetheramine before and after exposure to an aqueous fluid according to one or more examples.

FIG. 3 is a schematic illustrating an alternative system used with steam-assisted gravity drainage operations to deliver the aerosol to a downhole location according to one or more examples. It should be noted that while FIG. 3 generally depicts a land-based system, it is to be recognized that like systems may be operated in subsea locations as well. The system, generally 300, includes a first wellbore 310 and a second wellbore 312 penetrating a subterranean formation 314 for the purpose of recovering hydrocarbons, storing hydrocarbons, disposing of carbon dioxide, or the like. The wellbores 310 and 312 may be drilled into the subterranean formation 314 using any suitable drilling technique. The wellbores 310 and 312 may be vertical, deviated, horizontal, or curved over at least some portions of the wellbores 310 and 312. The wellbores 310 and 312 can be cased, open hole, contain tubing, and can comprise a variety of shapes or geometries.

A first workstring 316 can be supported in the first wellbore 310 and a second workstring 318 can be supported in the second wellbore 312. The first workstring 316 in the first wellbore 310 can include one or more steam injection nodes 320. The first wellbore 310 may have a heel 322 and a toe 324. In some embodiments, a plurality of steam injection nodes 320 can be positioned at various locations along the first wellbore 310, between the heel 322 and the toe 324. During steam-assisted gravity drainage operations, pressurized steam can be carried down the first workstring 316 and can be released into the first wellbore 310 via the steam injection nodes 320. In the examples described herein, a pressurized and heated aerosol comprising a vaporized carrier fluid and the polyhydroxyetheramine may be used in addition to or in place of the pressurized steam.

The heated aerosol may heat the subterranean formation 314, which may increase the temperature of hydrocarbon deposits contained with the subterranean formation 314. The hydrocarbons within said deposits may decrease in viscosity from the increase in temperature and may flow or drain more easily into the second wellbore 312 located adjacent to and beneath the first wellbore 310. The hydrocarbons may then be produced via the second workstring 318.

The heated aerosol may also be used to deposit the polyhydroxyetheramine on a portion of the subterranean formation 314. The deposited polyhydroxyetheramine may coat the contacted portion of the subterranean formation 122 treating any water-sensitive materials therein. The treated water-sensitive materials may be stabilized preventing or reducing swelling and/or deflocculation of the water-sensitive materials and reducing the negative impact of the steam and/or any aqueous fluids on the permeability of the surrounding formation. For example, the polyhydroxyetheramine coating may prevent the generation of fines that may otherwise drain into and potentially decrease the permeability of the flowpaths flowing into the second wellbore 312.

It is also to be recognized that the disclosed aerosols may also directly or indirectly affect the various downhole equipment and tools that may come into contact with the aerosols during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-6B.

EXAMPLES

The present disclosure can be better understood by reference to the following examples which are offered by way of illustration. The present disclosure is not limited to the examples given herein.

Example 1

Various water-sensitive materials were tested for swelling and the generation of fines by placing samples of said water-sensitive materials in a column at a specific level. A liquid phase carrier fluid of water (i.e. municipal tap water) with polyhydroxyetheramine dispersed therein was placed in the column at a level below that of the water-sensitive materials such that the liquid phase water with polyhydroxyetheramine dispersed therein did not contact the water-sensitive materials. The column was then heated in an oven at 100° C. for 8-12 hours. The water vaporized with the polyhydroxyetheramine dispersed therein to form an aerosol that rose in level in the column to contact and treat the water-sensitive materials. These vapor treated materials were then removed from the column and performance tests were done to evaluate the effect of treating the water-sensitive materials with an aerosol comprising the polyhydroxyetheramine. Fines generation and swelling of the materials were measured after exposure to deionized water. Control testing was also performed as was comparative testing with a 7% potassium chloride solution and a quaternary amine solution. Table 1 illustrates the results of the performance testing below.

TABLE 1

Turbidity Performance of Vapor Phase Treated Clay and Shale Materials

| | MST-Fines Generation | | | CST-Swelling | | Avg. | |
|---|---|---|---|---|---|---|---|
| Sample Treatment | Bentonite | Illite | EagleFord Shale | Bentonite | EagleFord Shale | MST | CST |
| Control | 3280 | 791 | 5386 | 651 | 24 | 3152 | 337 |
| Polyhydroxyetheramine | 943 | 412 | 62 | 15 | 1 | 473 | 7 |
| 7% Potassium Chloride | 243 | 282 | 302 | 1 | 1 | 272 | 1 |
| Quaternary Amine | 989 | 423 | 174 | 8.6 | 8.9 | 529 | 8.9 |

Example 2

An aerosol comprising a vaporized carrier fluid of water (i.e. municipal tap water) and dispersed polyhydroxyetheramine was flowed through a sandpack column comprising bentonite. Deionized water was then flowed through the same sandpack column and the eluate was observed for the presence of clay fines generated by the deflocculation of the bentonite particles in the sandpack. Comparative experiments were performed with a quaternary amine and a 7% potassium chloride solution. FIG. 4 is a photograph illustrating the visual presence of fines observed in the eluate of sandpacks treated in accordance with one or more examples. The first photo illustrates a bentonite sandpack treated with polyhydroxyetheramine. The second photo illustrates a bentonite sandpack treated with a quaternary amine. The third photo illustrates a bentonite sandpack treated with a 7% KCl brine solution.

Example 3

Permeability studies were performed on the treated sandpacks described above in Example 2. Deionized water was used as the eluent. It should be noted that although the quaternary amine had a slightly higher permeability profile, the eluate was turbid suggesting damage to the formation. Further, the polyhydroxyetheramine is a disproportionate permeability modifier and designed to resist the flow of aqueous fluids such as the deionized water without producing the same level of resistivity on the permeability of non-aqueous fluids. FIG. 5 is graph illustrating the results of the permeability tests.

Example 4

FIG. 6A is a photograph of a microscopic image of untreated bentonite before and after exposure to an aqueous fluid according to one or more examples. As illustrated, the bentonite particle becomes a colloidal dispersion in water and swells and begins to deflocculate producing fines.

FIG. 6B is a photograph of a microscopic image of bentonite treated with a polyhydroxyetheramine before and after exposure to an aqueous fluid according to one or more examples. The treated bentonite possesses a surface and has not become a colloidal dispersion as illustrated by the air bubble on the surface of the treated bentonite particle.

Provided are methods for treating a subterranean formation in accordance with the disclosure and the illustrated FIGURES. An example method comprises pumping an aerosol comprising a vaporized carrier fluid and a dispersed polyhydroxyetheramine in a wellbore penetrating the subterranean formation; depositing the polyhydroxyetheramine on a surface of the subterranean formation; and producing hydrocarbons from the treated subterranean formation. The method may further comprise mixing a liquid phase carrier fluid with the polyhydroxyetheramine to disperse the polyhydroxyetheramine therein. The method may further comprise introducing the liquid phase carrier fluid with the polyhydroxyetheramine dispersed therein into the wellbore; then vaporizing the liquid phase carrier fluid in the wellbore to produce the aerosol. The method may further comprise vaporizing the liquid phase carrier fluid with the polyhydroxyetheramine dispersed therein to produce the aerosol prior to pumping the aerosol in the wellbore. The method may further comprise passing a vaporized carrier fluid over the surface of the polyhydroxyetheramine to produce the aerosol. The treated subterranean formation may have reduced deflocculation. The treated subterranean formation may have reduced swelling. The carrier fluid may be selected from the group consisting of steam, methane, ethane, propane, butane, carbon dioxide, nitrogen, or a mixture thereof. The carrier fluid may comprise supercritical carbon dioxide. The polyhydroxyetheramine may be selected from the group consisting of a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino) propylamine/ethanolamine/poly(ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof.

Provided are methods for treating a subterranean formation in accordance with the disclosure and the illustrated FIGURES. An example method comprises producing an aerosol comprising a vaporized carrier fluid and a dispersed polyhydroxyetheramine; introducing the aerosol into an injection well penetrating the subterranean formation; wherein the injection well is adjacent to a production well penetrating the subterranean formation; depositing the polyhydroxyetheramine on a surface of the subterranean formation; and producing hydrocarbons from the production well. The method may further comprise mixing a liquid phase carrier fluid with the polyhydroxyetheramine to disperse the polyhydroxyetheramine therein. The method may further comprise vaporizing the liquid phase carrier fluid with the polyhydroxyetheramine dispersed therein to produce the aerosol prior to pumping the aerosol in the wellbore. The method may further comprise passing a vaporized carrier fluid over the surface of the polyhydroxyetheramine to produce the aerosol. The treated subterranean formation may have reduced deflocculation. The treated subterranean formation may have reduced swelling. The carrier fluid may be selected from the group consisting of steam, methane, ethane, propane, butane, carbon dioxide, nitrogen, or a mixture thereof. The carrier fluid may comprise supercritical carbon dioxide. The polyhydroxyetheramine may be selected from the group consisting of a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino) propylamine/ethanolamine/poly(ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof.

Provided are systems for treating a subterranean formation in accordance with the disclosure and the illustrated FIGURES. An example system comprises an aerosol comprising a vaporized carrier fluid and dispersed polyhydroxyetheramine; mixing equipment capable of containing the polyhydroxyetheramine; and pumping equipment capable of pumping the aerosol into the subterranean formation. The system may further comprise mixing a liquid phase carrier fluid with the polyhydroxyetheramine to disperse the polyhydroxyetheramine therein. The system may further comprise introducing the liquid phase carrier fluid with the polyhydroxyetheramine dispersed therein into the wellbore; then vaporizing the liquid phase carrier fluid in the wellbore to produce the aerosol. The system may further comprise vaporizing the liquid phase carrier fluid with the polyhydroxyetheramine dispersed therein to produce the aerosol prior to pumping the aerosol in the wellbore. The system may further comprise passing a vaporized carrier fluid over the surface of the polyhydroxyetheramine to produce the aerosol. The treated subterranean formation may have reduced deflocculation. The treated subterranean formation may have reduced swelling. The carrier fluid may be selected from the group consisting of steam, methane, ethane, propane, butane, carbon dioxide, nitrogen, or a mixture thereof. The carrier fluid may comprise supercritical carbon dioxide. The polyhydroxyetheramine may be selected from the group consisting of a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino) propylamine/ethanolamine/poly(ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating a subterranean formation:
   pumping an aerosol comprising a vaporized carrier fluid and a dispersed polyhydroxyetheramine in a wellbore penetrating the subterranean formation; wherein the carrier fluid is selected from the group consisting of methane, supercritical carbon dioxide, ethane, propane, butane, or a mixture thereof;
   contacting a surface of the subterranean formation with the aerosol;
   depositing the polyhydroxyetheramine on the surface of the subterranean formation; and
   producing hydrocarbons from the treated subterranean formation.

2. The method of claim 1, further comprising mixing a liquid phase carrier fluid with the polyhydroxyetheramine to disperse the polyhydroxyetheramine therein.

3. The method of claim 2, further comprising introducing the liquid phase carrier fluid with the polyhydroxyetheramine dispersed therein into the wellbore; then vaporizing the liquid phase carrier fluid in the wellbore to produce the aerosol.

4. The method of claim 2, further comprising vaporizing the liquid phase carrier fluid with the polyhydroxyetheramine dispersed therein to produce the aerosol prior to pumping the aerosol in the wellbore.

5. The method of claim 1, further comprising passing the vaporized carrier fluid over the surface of the polyhydroxyetheramine to produce the aerosol.

6. The method of claim 1, wherein the treated subterranean formation has reduced deflocculation.

7. The method of claim 1, wherein the treated subterranean formation has reduced swelling.

8. The method of claim 1, wherein the polyhydroxyetheramine is selected from the group consisting of a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly (ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof.

9. The method of claim 1, further comprising synthesizing the polyhydroxyetheramine by reacting a primary amine, a bis(secondary) diamine, a mono-amine-functionalized poly (alkylene oxide), or a mixture thereof with a diglycidyl ether, a diepoxy-functionalized poly(alkylene oxides), or a mixture thereof.

10. The method of claim 1, wherein the polyhydroxyetheramine comprises polyalkylene oxide sidechains.

11. The method of claim 1, wherein the polyhydroxyetheramine has a molecular weight in the range of about 1000 to about 500,000.

12. A method for treating a subterranean formation:
    producing an aerosol comprising a vaporized carrier fluid and a dispersed polyhydroxyetheramine; wherein the carrier fluid is selected from the group consisting of methane, ethane, propane, butane, supercritical carbon dioxide, or a mixture thereof;
    introducing the aerosol into an injection well penetrating the subterranean formation;
    wherein the injection well is adjacent to a production well penetrating the subterranean formation;
    contacting a surface of the subterranean formation with the aerosol;
    depositing the polyhydroxyetheramine on the surface of the subterranean formation; and
    producing hydrocarbons from the production well.

13. The method of claim 12, further comprising mixing a liquid phase carrier fluid with the polyhydroxyetheramine to disperse the polyhydroxyetheramine therein.

14. The method of claim 13, further comprising vaporizing the liquid phase carrier fluid with the polyhydroxyetheramine dispersed therein to produce the aerosol prior to introducing the aerosol into the injection well.

15. The method of claim 12, further comprising passing the vaporized carrier fluid over the surface of the polyhydroxyetheramine to produce the aerosol.

16. The method of claim 12, wherein the treated subterranean formation has reduced mineral deflocculation.

17. The method of claim 12, wherein the treated subterranean formation has reduced swelling.

18. The method of claim 12, further comprising synthesizing the polyhydroxyetheramine by reacting a primary amine, a bis(secondary) diamine, a mono-amine-functionalized poly(alkylene oxide), or a mixture thereof with a diglycidyl ether, a diepoxy-functionalized poly(alkylene oxides), or a mixture thereof.

19. The method of claim 12, wherein the polyhydroxyetheramine comprises polyalkylene oxide sidechains.

20. The method of claim 12, wherein the polyhydroxyetheramine is selected from the group consisting of a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3(dimethylamino)propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly (ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof.

* * * * *